(12) United States Patent
Saito et al.

(10) Patent No.: US 8,292,209 B2
(45) Date of Patent: Oct. 23, 2012

(54) WEBBING RETRACTOR

(75) Inventors: Takuhiro Saito, Aichi-ken (JP);
Yasunori Hattori, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 13/018,759

(22) Filed: Feb. 1, 2011

(65) Prior Publication Data
US 2011/0204173 A1 Aug. 25, 2011

(30) Foreign Application Priority Data

Feb. 19, 2010 (JP) .................................. 2010-035163

(51) Int. Cl.
*B65H 75/48* (2006.01)
(52) U.S. Cl. .................... 242/374; 242/394.1; 242/375.1
(58) Field of Classification Search .................. 242/374, 242/375.1, 390, 390.8–390.9, 394, 394.1
See application file for complete search history.

(56) References Cited

U.S. PATENT DOCUMENTS

| 7,533,842 B2 | 5/2009 | Saito et al. | |
| 2010/0264245 A1 * | 10/2010 | Ando | 242/390 |
| 2011/0089280 A1 * | 4/2011 | Ando et al. | 242/374 |

FOREIGN PATENT DOCUMENTS

| DE | 102008011790 | | 9/2009 | |
| EP | 1886883 A1 * | | 2/2008 | 242/390 |
| JP | 2005-289259 | | 10/2005 | |
| JP | 2010253969 A * | | 11/2010 | 242/390 |
| JP | 2010253970 A * | | 11/2010 | 242/390 |

* cited by examiner

*Primary Examiner* — Sang Kim
(74) *Attorney, Agent, or Firm* — Roberts Mlotkowski Safran & Cole, P.C.

(57) ABSTRACT

An operating load of an overload releasing mechanism is made to be high by a simple method. In a webbing retractor, spring claws engage with recesses of a rotor, and a gear wheel and the rotor are connected. When relative rotational force is applied between the rotor and the gear wheel, the spring claws elastically deform and engagement thereof with the recesses is released. Due thereto, connection of the rotor and the gear wheel is released, and the overload releasing mechanism is operated. Here, urging members urge the spring claws toward a side of engaging with the recesses. Due thereto, the operating load of the overload releasing mechanism can be made to be high by a simple method of merely adding the urging members.

4 Claims, 8 Drawing Sheets

WEBBING RETRACTOR

CROSS-REFERENCE TO RELATED APPLICATION

This application is based on and claims priority under 35 USC 119 from Japanese Patent Application No. 2010-035163 filed on Feb. 19, 2010, which is incorporated by reference herein.

BACKGROUND

1. Technical Field

The present invention relates to a webbing retractor that houses a webbing, that is for restraining a vehicle occupant, in a state in which the webbing is taken-up on a take-up shaft.

2. Related Art

There are known webbing retractors that are structured so as to transmit the rotational force of a motor to a take-up shaft via a clutch, and take-up a webbing (see, for example Japanese Patent Application Laid-Open (JP-A) No. 2005-289259). At the clutch of the webbing retractor shown in JP-A No. 2005-289259, spring claws of a ring are inserted and disposed between a rotor and a gear wheel that is disposed at the outer periphery of the rotor. Relative rotation of the ring with respect to the gear wheel is restricted. The distal end portions of the spring claws engage with external teeth formed at the outer peripheral portion of the rotor. Due thereto, relative rotation between the rotor and the gear wheel is restricted.

In the webbing retractor of the above-described structure, when relative rotational force of greater than or equal to a predetermined value is applied between the rotor and the gear wheel, the spring claws elastically deform and the distal end portions of the spring claws are pulled-out from valley portions of the external teeth of the rotor, and the rotor and the gear wheel thereby rotate relatively (an overload releasing mechanism is operated).

Here, in the above-described webbing retractor, in order to further increase the load at which the overload releasing mechanism operates, the deformation resisting load of the spring claws must be increased. However, when the plate thickness or the width of the spring claws is increased in order to further increase the deformation resisting load of the spring claws, the shapes of the other parts must be changed.

SUMMARY

In view of the aforementioned, an object of the present invention is to provide a webbing retractor that, by a simple method, can make the operating load of an overload releasing mechanism be high.

A webbing retractor relating to an aspect of the present invention includes: a take-up shaft around which a webbing for restraining a vehicle occupant is taken-up; a motor side rotating body that is rotated due to rotation of a motor being transmitted thereto; a take-up shaft side rotating body that is provided so as to be able to rotate relative to the motor side rotating body, and that rotates the take-up shaft due to rotation of the take-up shaft side rotating body being transmitted to the take-up shaft; a connecting member that has an elastically deforming portion engaging with an engaging portion provided at one of the motor side rotating body or the take-up shaft side rotating body, and that connects the motor side rotating body with the take-up shaft side rotating body, and, when relative rotational force is applied between the motor side rotating body and the take-up shaft side rotating body, the elastically deforming portion elastically deforms and engagement of the elastically deforming portion with the engaging portion is released, and connection between the motor side rotating body and the take-up shaft side rotating body is thereby released; and an elastic body that urges the elastically deforming portion toward a side of engaging with the engaging portion.

In the above-described webbing retractor, the connecting member has the elastically deforming portion that engages with the engaging portion that is provided at one of the motor side rotating body and the take-up shaft side rotating body. The connecting member connects the motor side rotating body and the take-up shaft side rotating body. Therefore, when rotation of the motor is transmitted and the motor side rotating body rotates, the rotation of the motor side rotating body is transmitted to the take-up shaft side rotating body via the connecting member. Due thereto, the rotation of the take-up shaft side rotating body is transmitted to the take-up shaft, and the take-up shaft rotates.

Further, when relative rotational force is applied between the motor side rotating body and the take-up shaft side rotating body, the elastically deforming portion elastically deforms, and the connecting member releases the engagement of the elastically deforming portion with the engaging portion. The connection between the motor side rotating body and the take-up shaft side rotating body is thereby released (the overload releasing mechanism is operated). Due thereto, relative rotation between the motor side rotating body and the take-up shaft side rotating body becomes possible.

Here, in the webbing retractor, the elastic body urges the elastically deforming portion of the connecting member toward the side of engaging with the engaging portion. Therefore, when the overload releasing mechanism operates, the engagement of the elastically deforming portion with the engaging portion is released against not only the elastic force of the elastically deforming portion, but also against the urging force of the elastic body. Due thereto, the operating load of the overload releasing mechanism can be made to be high by the simple method of merely adding the elastic body.

The elastic body of the above-described webbing retractor may be disposed between the elastically deforming portion and the other of the motor side rotating body and the take-up shaft side rotating body.

In the webbing retractor of the above-described aspect, the elastic body is disposed between the elastically deforming portion and the other of the motor side rotating body and the take-up shaft side rotating body. Due thereto, an increase in the size of the webbing retractor can be suppressed.

The elastic body of the above-described webbing retractor may be structured so as to urge the elastically deforming portion in the radial direction of the motor side rotating body and the take-up shaft side rotating body.

In the webbing retractor of the above-described aspect, the urging force, by which the elastic body urges the elastically deforming portion, acts in the radial direction of the motor side rotating body and the take-up shaft side rotating body. Due thereto, the operating load of the overload releasing mechanism can efficiently be made to be high.

As described above, in the webbing retractor relating to the present invention, the operating load of an overload releasing mechanism can be made to be high by a simple method.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
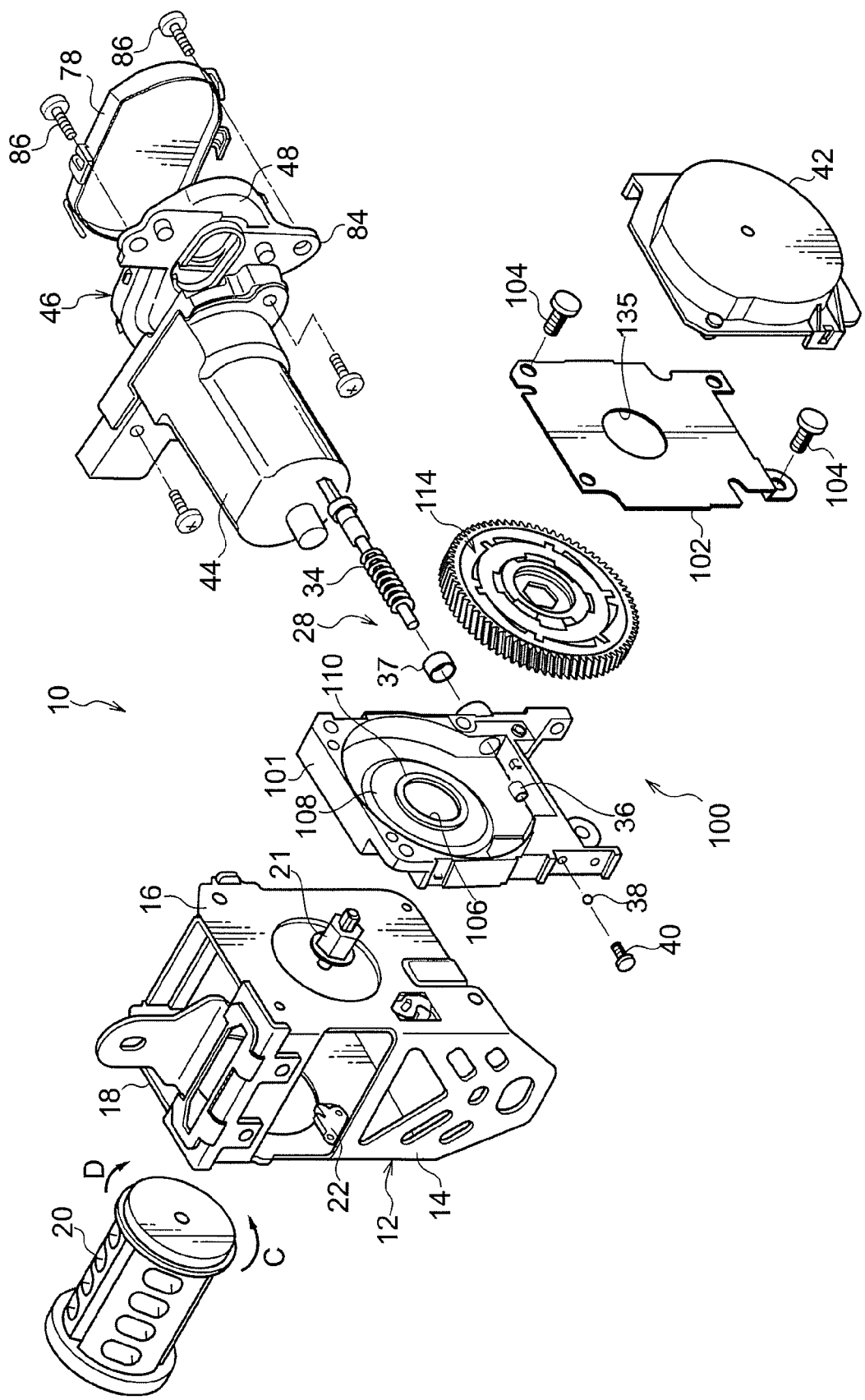
FIG. 1 is a schematic exploded perspective view showing the structure of a webbing retractor relating to a first exemplary embodiment of the present invention.

A webbing retractor 10 relating to a first exemplary embodiment of the present invention is shown in a schematic exploded perspective view in FIG. 1.

As shown in FIG. 1, the webbing retractor 10 has a frame 12. The frame 12 is structured by a substantially-plate-shaped back plate 14, and a leg plate 16 and a leg plate 18 that are a pair that extend-out integrally from the both transverse direction ends of the back plate 14. The back plate 14 is mounted to a vehicle body by being fixed to the vehicle body by an unillustrated fastening means such as bolts or the like.

A spool 20, which serves as a take-up shaft and is manufactured by die-casting or the like, is rotatably disposed between the leg plate 16 and the leg plate 18 of the frame 12. The spool 20 is formed overall in the shape of a drum, and the proximal end portion of a webbing (not illustrated), that is formed in the shape of an elongated strip, is connected and fixed thereto. When the spool 20 is rotated in one direction around the axis thereof (the arrow C direction in FIG. 1, which is called the "take-up direction" hereinafter), the webbing is taken-up in the form of layers onto the outer peripheral portion of the spool 20 from the proximal end side of the webbing. On the other hand, when the webbing is pulled from the distal end side thereof, accompanying this, the webbing is pulled-out while the spool 20 rotates in the other direction around the axis (the arrow D direction in FIG. 1, which is called the "pull-out direction" hereinafter).

One end side of the spool 20 passes-through the leg plate 18 and projects-out to the exterior of the frame 12. An unillustrated locking mechanism is disposed at the side of the leg plate 18. At the time of a rapid deceleration of the vehicle or the like, rotation of the spool 20 in the pull-out direction is impeded due to operation of the locking mechanism.

On the other hand, the other end side of the spool 20 passes-through the leg plate 16 and projects-out slightly to the exterior of the frame 12. A connecting screw 21, which is formed in the shape of a hexagonal prism, is connected coaxially and integrally to this other end side of the spool 20.

Further, a clutch case 101 that structures a clutch 100 is disposed at the outer side of the leg plate 16. The clutch case 101 is formed in the shape of a box from a metal material or the like (e.g., an aluminum alloy or the like), and opens toward the side opposite the leg plate 16. A clutch cover 102, which is formed from an iron plate or the like, is disposed at the open side of the clutch case 101. The clutch case 101 and the clutch cover 102 are fixed integrally to the leg plate 16 by screws 104.

A circular through-hole 106 is formed coaxially with the spool 20 in the central portion of the floor wall of the clutch case 101. The connecting screw 21 is passed-through the through-hole 106. The region at the periphery of the through-hole 106 projects-out slightly in a circular form toward the side opposite the leg plate 16, and a sliding surface 108 that is ring-shaped is formed. Further, a bushing support portion 110, that is cylindrical-tube-shaped and projects-out toward the side opposite the leg plate 16, is formed at the hole edge portion of the through-hole 106. A bushing 112 (see FIG. 2 and FIG. 3), that is described below and is formed in a ring-shape of a resin material or the like, is supported at the bushing support portion 110.

A clutch gear portion 28 is disposed at the interior of the clutch case 101. The clutch gear portion 28 has a worm gear 34. The axis of the worm gear 34 is disposed in a state of being orthogonal to the spool 20, and an end portion of the worm gear 34 is supported at the clutch case 101 via bushes 36, 37. This one end side of the worm gear 34 is provided so as to project-out toward the exterior from the clutch case 101. Further, a steel ball 38 is accommodated in a bearing portion of the clutch case 101 that supports the distal end portion of the worm gear 34, and contacts the distal end portion of the worm gear 34. An adjustment screw 40 is screwed into the bearing portion. Due to the distal end portion of the adjustment screw 40 pushing the steel ball 38, the steel ball 38 is made to press-contact the distal end of the worm gear 34. Due thereto, displacement in the axial direction of the worm gear 34 is restricted (the thrust is adjusted). Note that there may be a structure in which the steel ball 38 is formed integrally with the distal end portion of the adjustment screw 40 (i.e., a structure in which the distal end portion of the screw 40 is formed in a spherical shape). A clutch main body portion 114 that structures the clutch 100 is provided at the upper side of the worm gear 34.

Figure 2:
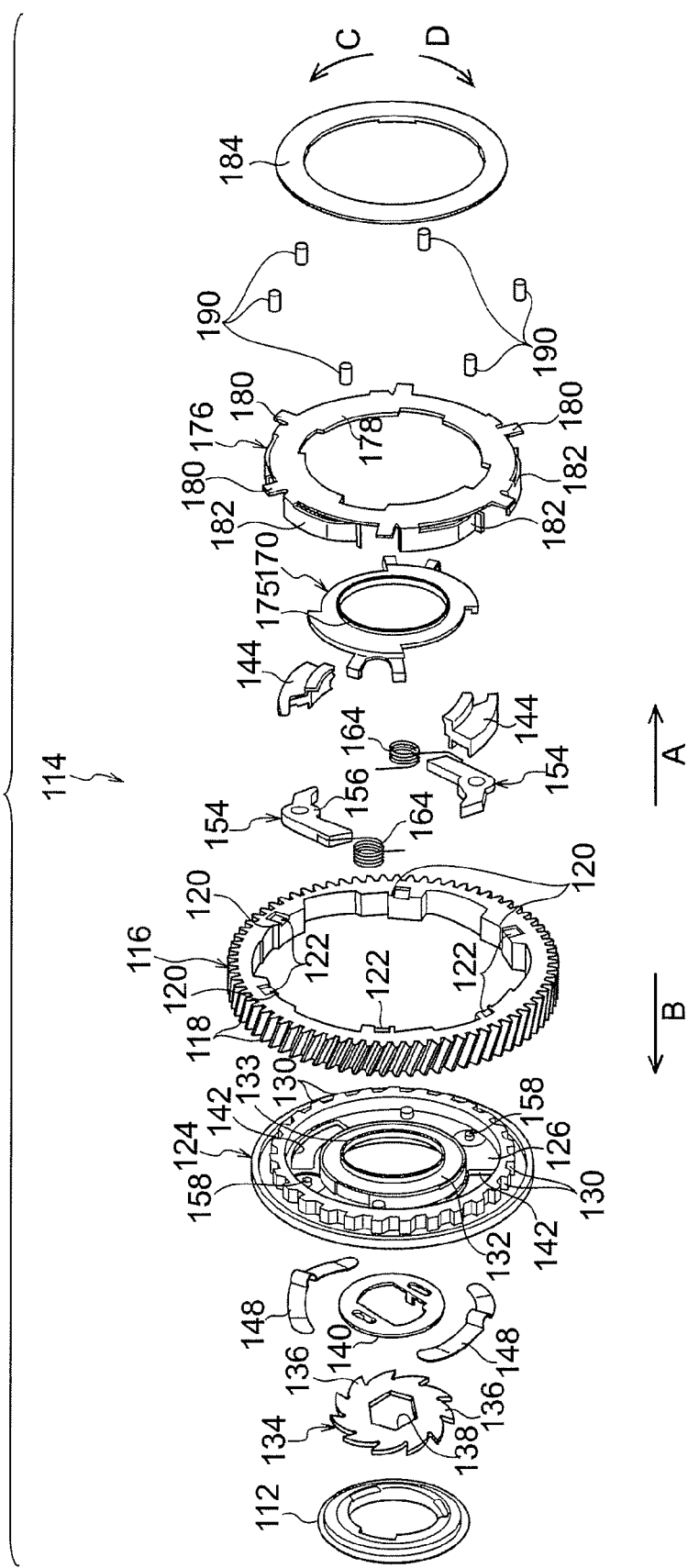
FIG. 2 is an exploded perspective view that is seen from one side and that shows the structure of main portions of a clutch that is a structural part of the webbing retractor relating to the first exemplary embodiment of the present invention.
Figure 3:
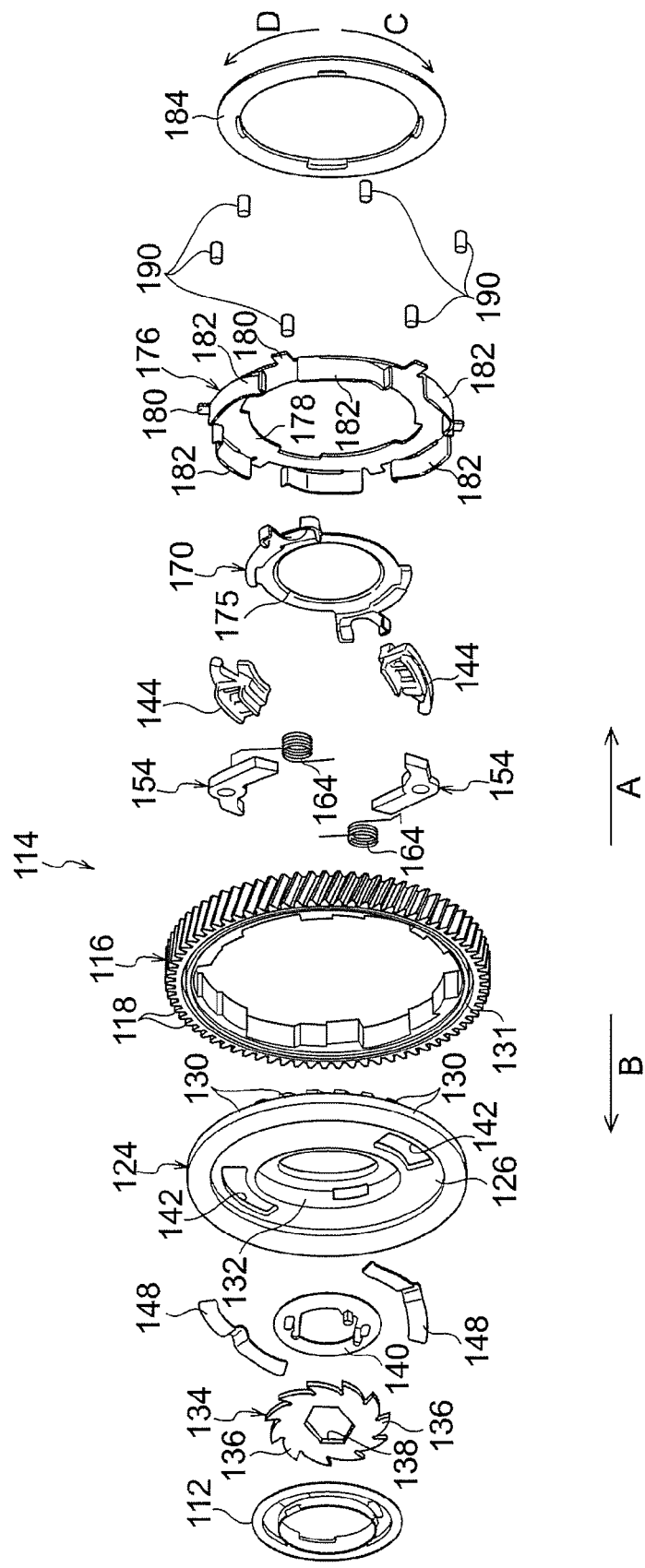
FIG. 3 is an exploded perspective view that is seen from another side and that shows the structure of the main portions of the clutch that is a structural part of the webbing retractor relating to the first exemplary embodiment of the present invention.

The structure of the clutch main body portion 114 is shown in exploded perspective views in FIG. 2 and FIG. 3.

As shown in FIG. 2 and FIG. 3, the clutch main body portion 114 has a gear wheel 116 that serves as a motor side rotating body and that structures an overload releasing mechanism. The gear wheel 116 is formed in a ring shape of a resin material or the like, and is disposed coaxially with the spool 20. External teeth 118 are formed at the outer peripheral portion of the gear wheel 116. The external teeth 118 mesh-together with the worm gear 34. Further, plural (six in the present exemplary embodiment) peripheral direction load receiving portions 120 are formed at the inner peripheral portion of the gear wheel 116, along the radial direction and at uniform intervals. These peripheral direction load receiving portions 120 correspond to spring claws 182 of a ring 176 that is described below. Moreover, plural (six in the present exemplary embodiment) rotation stopping recesses 122 are formed at the end surface at one side in the axial direction (the arrow A direction side in FIG. 2 and FIG. 3) of the gear wheel 116, along the peripheral direction and at uniform intervals. These rotation stopping recesses 122 correspond to rotation stopping claws 180 of the ring 176 that is described below.

A rotor 124, that serves as a take-up shaft side rotating body and that structures the overload releasing mechanism, is disposed at the inner side of the gear wheel 116. The rotor 124 is formed in the shape of a disc of a metal material or the like (e.g., a zinc aluminum alloy or the like), and is disposed coaxially to the gear wheel 116. The rotor 124 has a main body portion 126 that is shaped as a cylindrical tube having a floor.

Figure 5:
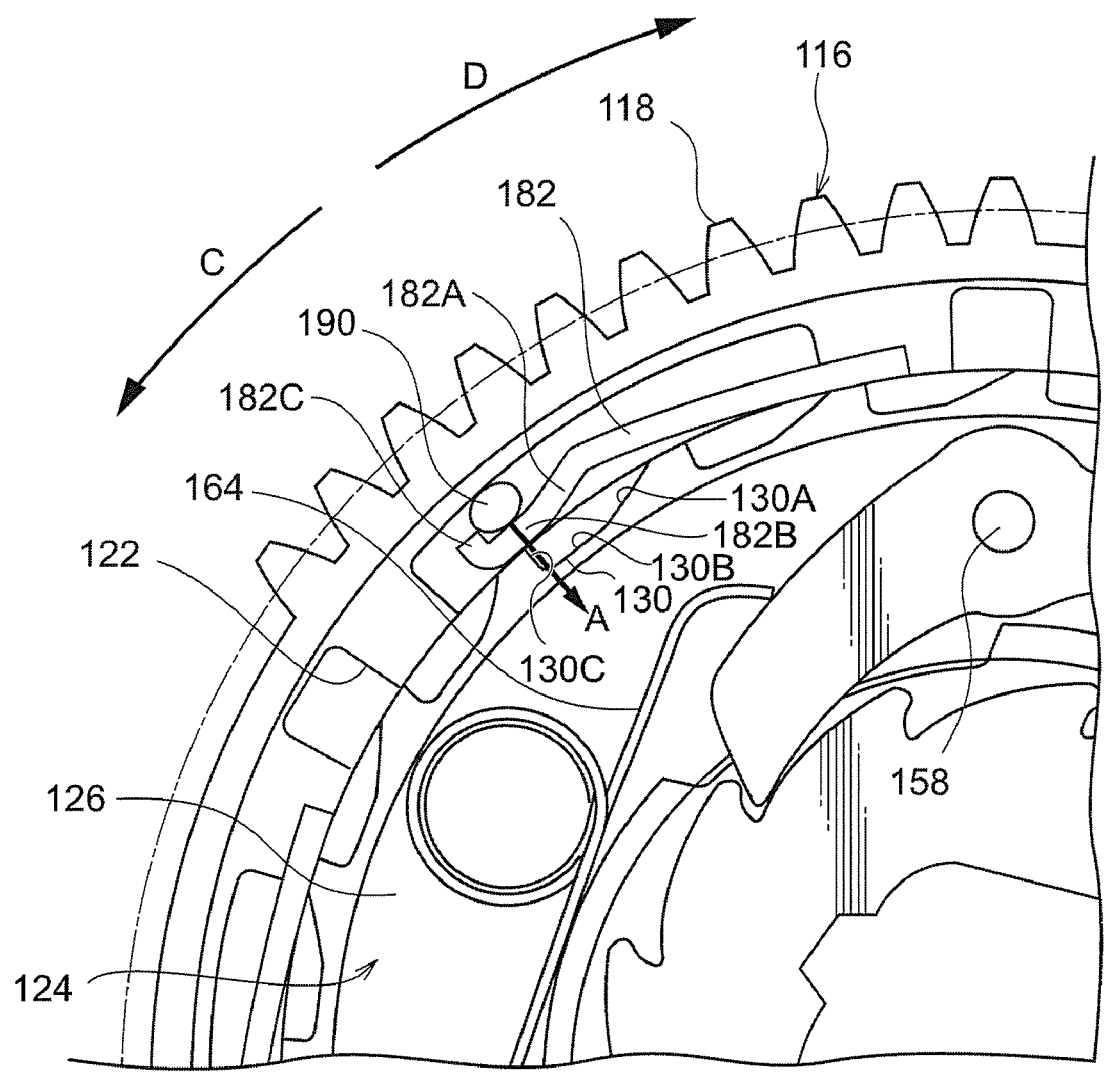
FIG. 5 is a plan view showing a partial structure of the clutch that is a structural part of the webbing retractor relating to the first exemplary embodiment of the present invention.

Plural recesses 130, that serve as engaging portions and that structure the overload releasing mechanism, are formed in the outer peripheral portion of the main body portion 126, at uniform intervals along the peripheral direction. As shown in FIG. 5, at each of the recesses 130, a side surface 130A at one peripheral direction side of the main body portion 126 (the arrow D direction side in FIG. 5) is, toward the one peripheral direction side of the main body portion 126, inclined in the direction heading toward the radial direction outer side of the main body portion 126. A side surface 130C at the other peripheral direction side of the main body portion 126 (the arrow C direction side in FIG. 5) is formed so as to be perpendicular to the peripheral direction of the main body portion 126. Further, at each of the recesses 130, a floor surface 130B between the side surface 130A and the side surface 130C is formed so as to be perpendicular to the radial direction of the main body portion 126. In other words, the cross-sectional shape of the recess 130 is a trapezoidal shape.

As shown in FIG. 2 and FIG. 3, an accommodating portion 132 that is substantially cylindrical-tube-shaped is formed coaxially at the central portion of the floor wall of the main body portion 126. A ring-shaped shaft supporting portion 133 projects-out coaxially at one side in the axial direction (the arrow A direction side in FIG. 2 and FIG. 3) of the accommodating portion 132. This shaft supporting portion 133 is supported so as to rotate freely, via a rotation supporting portion 175 of a holder 170 that is described below, at a circular hole 135 (see FIG. 1) that is formed in the clutch cover 102. Further, the bushing 112 is fit together, so as to rotate freely, with the other side in the axial direction (the arrow B direction side in FIG. 2 and FIG. 3) of the accommodating portion 132. This other side in the axial direction of the accommodating portion 132 is supported, so as to rotate freely, at the clutch case 101 via the bushing 112. Due thereto, the main body portion 126 (the rotor 124) can rotate around its own axis.

A ratchet 134 that is formed in a substantial ring shape by an iron plate or the like, is accommodated within the accommodating portion 132 of the main body portion 126. External teeth 136 that are so-called ratchet teeth are formed at the outer peripheral portion of the ratchet 134. A through-hole 138, that is hexagonal in cross-section, is formed in the axially central portion of the ratchet 134. In the state in which the connecting screw 21 is passed-through the through-hole 138, the connecting screw 21 is connected integrally around the axis thereof. Due thereto, the ratchet 134 and the spool 20 rotate integrally via the connecting screw 21.

A washer 140, that is formed of a resin material or the like, is mounted to the other end in the axial direction (the arrow A direction side in FIG. 2 and FIG. 3) of the ratchet 134. The washer 140 slidably abuts the ring-shaped floor wall of the accommodating portion 132, and displacement of the ratchet 134 along the axial direction is thereby restricted.

On the other hand, a pair of guide holes 142, that are curved along the peripheral direction of the main body portion 126, are formed in the floor wall of the main body portion 126 at the radial direction outer side of the accommodating portion 132. Sliders 144, that are formed of a resin material or the like in substantial block shapes that are curved along the peripheral direction of the main body portion 126, are slidably attached to the respective guide holes 142.

One side of each slider 144 (the arrow A direction side in FIG. 2 and FIG. 3) abuts the clutch cover 102 (see FIG. 1). Further, a retainer 148 is provided at the other side of each slider 144 (the arrow B direction side in FIG. 2 and FIG. 3). Each of the retainers 148 is a thin-width metal piece having a spring property, and is bent into a substantial V-shape. The retainers 148 are connected integrally to the sliders 144. The longitudinal direction both end portions of the retainers 148 are pushed against the sliding surface 108 of the clutch case 101 and elastically deform by a predetermined amount.

Therefore, the sliders 144 are pushed against the clutch cover 102 by the elastic forces of the retainers 148, and a predetermined frictional force is imparted to the movement of the sliders 144 along the guide holes 142 (the relative movement with respect to the rotor 124). Due thereto, when the rotor 124 rotates, the sliders 144 are temporarily held at the clutch case 101 and the clutch cover 102 due to this frictional force, and move relative to the rotor 124 within a predetermined range along the guide holes 142.

One end portion of each slider 144 in the direction of curving thereof (the end portion at the arrow C direction side in FIG. 2 and FIG. 3) corresponds to a lock bar 154.

Each of the lock bars 154 is formed by an iron plate or the like and in a substantial V-shape, and is disposed at one end side in the curving direction of the corresponding slider 144. The lock bars 154 are supported, so as to rotate freely, by supporting shafts 158 that are shaped as solid cylinders and that project from the floor wall of the main body portion 126. Due to the lock bars 154 rotating around the supporting shafts 158, the distal end portions of the lock bars 154 mesh with the external teeth 136 of the ratchet 134. Further, the lock bars 154 are always urged, by the urging forces of torsion coil springs 164, in the direction of meshing together with the external teeth 136 (the ratchet 134).

Figure 4A:
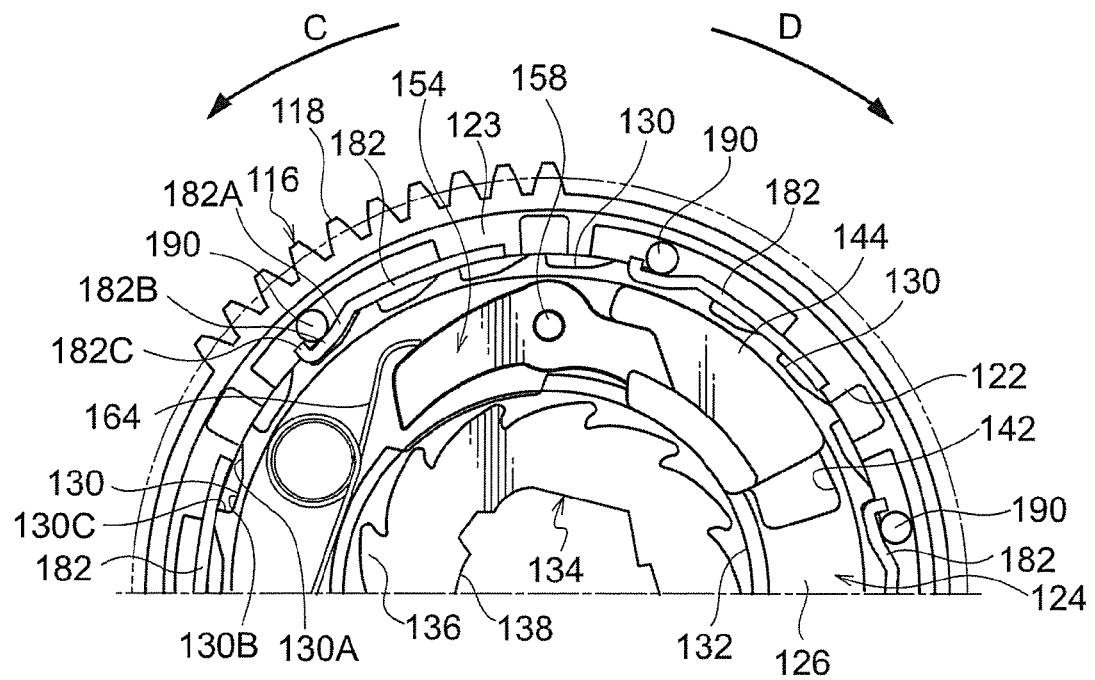
FIG. 4A is a plan view showing a state in which a lock bar is held at a slider, in the structure of the clutch that is a structural part of the webbing retractor relating to the first exemplary embodiment of the present invention.
Figure 4B:
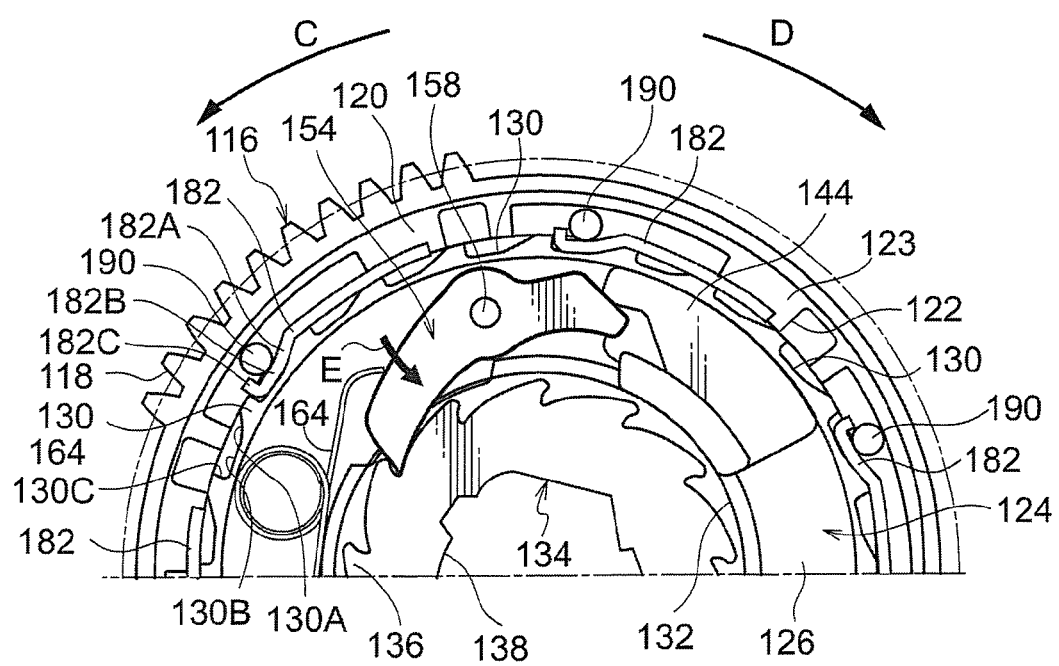
FIG. 4B is a plan view showing a state in which the lock bar is engaged with a ratchet, in the structure of the clutch that is a structural part of the webbing retractor relating to the first exemplary embodiment of the present invention.

Here, as shown in FIG. 4A and FIG. 4B, due to the rotor 124 moving relative to the sliders 144, the lock bars 154 approach or move away from the sliders 144 within a predetermined range. In the state in which the lock bars 154 have approached the sliders 144 (the state shown in FIG. 4A), the lock bars 154 are apart from the ratchet 134.

On the other hand, in the state in which the lock bars 154 have moved apart from the sliders 144 (the state shown in FIG. 4B), the lock bars 154 are moved toward the ratchet 134 (the engaging positions) by the urging forces of the torsion coil springs 164, and the distal end portions of the lock bars 154 mesh-together with the external teeth 136.

Note that, at the clutch main body portion 114 relating to the present exemplary embodiment, the sliders 144 are usually disposed adjacent to the lock bars 154. Accordingly, the lock bars 154 are held at engagement released positions (the state shown in FIG. 4A).

As shown in FIG. 2 and FIG. 3, the holder 170, that is formed in the shape of a ring of a resin material or the like, is disposed at the side of the lock bars 154 opposite the side at which the rotor 124 is located (i.e., at the arrow A direction side of the lock bars 154 in FIG. 2 and FIG. 3). The holder 170 restricts displacement in the axial direction of the lock bars 154 and the torsion coil springs 164 with respect to the rotor 124.

On the other hand, the ring 176, that serves as a connecting member and structures the overload releasing mechanism, is disposed at the radial direction outer side of the holder 170 and at one side in the axial direction (the arrow A direction side in FIG. 2 and FIG. 3) of the rotor 124. The ring 176 is formed in a ring shape of a metal material (e.g., SUS or the like) having a spring property, and has a cover portion 178 that is disposed coaxially to the rotor 124. The plural (six in the present exemplary embodiment) rotation stopping claws 180, which project-out toward the radial direction outer side of the cover portion 178, are formed integrally with the outer peripheral portion of the cover portion 178. These rotation stopping claws 180 fit-together with the rotation stopping recesses 122 of the gear wheel 116. Due thereto, relative rotation of the ring 176 with respect to the gear wheel 116 is restricted.

The spring claws 182 that serve as elastically deforming portions are provided at the outer peripheral portion of the cover portion 178. The spring claws 182 are shaped as thin-width plates having elasticity (spring property), and are provided integrally along the peripheral direction of the cover portion 178 and at uniform intervals. The proximal end portion of each spring claw 182 is connected integrally to the cover portion 178, and the spring claw 182 is, on the whole, curved along the peripheral direction of the cover portion 178. Further, as shown in FIG. 4A, at the distal end portion of each spring claw 182, an inclined portion 182A is formed at one side in the peripheral direction of the cover portion 178 (the arrow D direction in FIG. 4A and FIG. 4B) so as to be inclined toward the radial direction outer side, along the direction heading toward the one peripheral direction side of the cover portion 178. A peripheral direction abutting portion 182C is formed at the other side in the peripheral direction of the cover portion 178 (the arrow C direction in FIG. 4A and FIG. 4B), so as to be perpendicular to the peripheral direction of the cover portion 178. Further, a radial direction abutting portion 182B is formed perpendicular to the radial direction of the cover portion 178, between the inclined portion 182A and the peripheral direction abutting portion 182C of each of the spring claws 182. The inclined portion 182A, the radial direction abutting portion 182B and the peripheral direction abutting portion 182C are formed integrally.

At the distal end portion of each of the spring claws 182, the inclined portion 182A abuts the side surface 130A of the recess 130, the radial direction abutting portion 182B abuts the floor surface 130B of the recess 130, and the peripheral direction abutting portion 182C abuts the side surface 130C of the recess 130, such that the distal end portion of the spring claw 182 is engaged with the recess 130. The proximal end portion of each of the spring claws 182 abuts the peripheral direction load receiving portion 120 of the gear wheel 116. Due thereto, the gear wheel 116 and the rotor 124 are connected integrally by the spring claws 182 with respect to the peripheral direction (relative rotation thereof is restricted). When the gear wheel 116 rotates, the gear wheel 116 and the rotor 124 basically rotate integrally.

Urging members 190, that serve as elastic bodies and structure the overload releasing mechanism, are disposed between the distal end portions of the respective spring claws 182 and the inner peripheral surface of the gear wheel 116. The urging members 190 are formed of rubber and in the shapes of solid cylinders. In the state in which the urging members 190 are elastically deformed or in the state in which the urging members 190 are not elastically deformed, the urging members 190 abut the radial direction abutting portions 182B of the spring claws 182 and the inner peripheral surface of the gear wheel 116.

Here, as shown in FIG. 5, when rotational force of a predetermined value or more is applied between the rotor 124 and the gear wheel 116, the peripheral direction abutting portions 182C of the spring claws 182 are pushed toward the radial direction outer side of the rotor 124 by the side surfaces 130C of the recesses 130 of the rotor 124. When the peripheral direction abutting portions 182C of the spring claws 182 are pushed toward the radial direction outer side of the rotor 124, the peripheral walls of the urging members 190 are pushed toward the radial direction outer side of the rotor 124 by the radial direction abutting portions 182B of the spring claws 182. Therefore, the urging members 190 are pushed by the radial direction abutting portions 182B of the spring claws 182 and the inner peripheral surface of the gear wheel 116 and elastically deform, and the spring claws 182 elastically deform. Due thereto, due to the distal end portions of the spring claws 182 being pulled-out from the recesses 130, the connection, around the axis, of the gear wheel 116 and the rotor 124 by the spring claws 182 is cancelled. Accordingly, relative rotation between the gear wheel 116 and the rotor 124 is permitted (the overload mechanism is operated).

On the other hand, as shown in FIG. 2 and FIG. 3, a spacer 184 that is formed in a ring shape of a resin material or the like is disposed at the side of the ring 176 opposite the side at which the rotor 124 is disposed (i.e., is disposed at the arrow A direction side of the ring 176 in FIG. 2 and FIG. 3). The spacer 184 is nipped between the ring 176 and the clutch cover 102, and cannot rotate relative to the ring 176 around the axis thereof.

The clutch 100 of the above-described structure is structured such that the gear wheel 116 of the clutch main body portion 114 rotates due to the worm gear 34 of the clutch gear portion 28 rotating. The clutch main body portion 114 and the clutch gear portion 28 are assembled integrally at a single case (the clutch case 101 and the clutch cover 102), and are structured as a unit overall.

On the other hand, as shown in FIG. 1, a spring complete 42 is disposed at the side of the clutch cover 102. The spring complete 42 accommodates therein a spiral spring (not illustrated). The end portion, at the outer side in the direction of the spiral, of this spiral spring is anchored on the case main body. The end portion, at the inner side in the direction of the spiral, of the spiral spring is anchored on the distal end of the connecting screw 21 that passes-through the clutch main body portion 114. The spiral spring urges the spool 20 in the take-up direction.

A motor 44 and a motor gear portion 46 are disposed between the leg plate 16 and the leg plate 18, beneath the spool 20. The motor 44 and the motor gear portion 46 have a housing 48. The motor 44 is mounted to one side of the housing 48, and the motor gear portion 46 is provided at the other side of the housing 48. The motor 44 is fixed to the one side of the housing 48 in a state in which the distal end side (output side) of the rotating shaft (not shown) of the motor 44 is directed toward the housing 48. The distal end (output side) of the rotating shaft projects-out to the other side (the motor gear portion 46 side) of the housing 48.

A pinion (not shown), that structures plural spur gears of the motor gear portion 46, is mounted to the distal end of the rotating shaft of the motor 44 that projects-out to the other side (the motor gear portion 46 side) of the housing 48. Plural (two in the present exemplary embodiment) gears (not shown), which are each a spur gear having external teeth, are accommodated in the motor gear portion 46 in a state of being meshed-together. These gears are disposed in a state in which the axes thereof are parallel to the rotating shaft of the motor 44. Further, these gears mesh together with the unillustrated pinion that is mounted to the rotating shaft of the motor 44. The final spur gear is detachably connected to one end portion of the worm gear 34 that projects-out toward the outer side from the clutch case 101 of the clutch gear portion 28. Therefore, when the motor 44 is driven, driving force is transmitted via the unillustrated pinion and the unillustrated gears, and the worm gear 34 is rotated. Further, the unillustrated pinion and unillustrated gears are covered by a gear cover 78 that is mounted to the housing 48.

A mounting stay 84, that is provided integrally with the housing 48 of the motor 44 and the motor gear portion 46 that have the above-described structure, is detachably mounted by screws 86 to the clutch case 101 (i.e., the frame 12) that houses the clutch main body portion 114 and the clutch gear portion 28. Further, the motor 44 is structured so as to be operated on the basis of, for example, a detection signal of a forward monitoring device or the like.

Operation of the present first exemplary embodiment is described next.

In the present webbing retractor 10, when a vehicle occupant sits-down on a seat of the vehicle and pulls-out the webbing that is housed in the present webbing retractor 10, the webbing is pulled-out while the spool 20 rotates in the pull-out direction. Due thereto, the vehicle occupant can apply the webbing to his/her body by placing the webbing around his/her body, and, for example, engaging a tongue plate provided at the webbing with a buckle device.

On the other hand, when, for example, there is an obstacle in front of the vehicle while the vehicle is traveling, and further, the interval between the vehicle and the obstacle (the distance from the vehicle to the obstacle) comes to within a predetermined range, driving of the motor 44 is started, and the rotating shaft of the motor 44 is rotated rapidly.

When the rotating shaft of the motor 44 is rotated, the rotational force thereof is transmitted to the gear wheel 116 of the clutch main body portion 114 via the unillustrated pinion and the unillustrated gears of the motor gear portion 46 and via the worm gear 34 of the clutch gear portion 28, and the gear wheel 116 is rapidly rotated in the take-up direction (the arrow C direction in FIG. 1). The rotation of the gear wheel 116 in the take-up direction is transmitted, via the peripheral direction load receiving portions 120, to the proximal end portions of the spring claws 182 of the ring 176, and is transmitted from the distal end portions of the spring claws 182 to the recesses 130 of the rotor 124, and the rotor 124 is rapidly rotated in the take-up direction.

At this time, the sliders 144 are held at the clutch case 101 and the clutch cover 102 by the frictional force that acts on the sliders 144 and the retainers 148. Therefore, the rotor 124 moves relative to the sliders 144 within a predetermined range, and the lock bars 154 that are supported at the rotor 124 move apart from the sliders 144.

Therefore, the lock bars 154 move toward the ratchet 134 side due to the urging forces of the torsion coil springs 164, and the distal end portions of the lock bars 154 mesh-together with the external teeth 136 of the ratchet 134 (refer to arrow E in FIG. 4B). Due thereto, the rotation of the rotor 124 in the take-up direction is transmitted to the ratchet 134 via the lock bars 154, and the ratchet 134 is rotated rapidly in the take-up direction. Because the ratchet 134 is connected integrally to the spool 20, the spool 20 is rotated rapidly in the take-up direction together with the ratchet 134.

Due thereto, the webbing is taken-up on the spool 20, and the slight looseness, or so-called "slack", in the webbing is eliminated, and the force by which the webbing restrains the body of the vehicle occupant improves.

Further, in the state in which the "slack" is eliminated, the body of the vehicle occupant becomes an obstruction, and basically, the webbing cannot be taken-up any further onto the spool 20. Therefore, load of a predetermined value or more is applied to the spool 20 from the webbing, and as a result, load of a predetermined value or more is applied to the rotor 124 via the ratchet 134 and the lock bars 154.

At this time, the gear wheel 116 attempts to rotate in the take-up direction (the arrow C direction in FIG. 1) due to the driving force of the motor 44, and therefore, relative rotational force is applied between the gear wheel 116 and the rotor 124. When this rotational force becomes greater than or equal to a predetermined value, as shown in FIG. 5, the peripheral direction abutting portions 182C of the spring claws 182 are pushed toward the radial direction outer side of the rotor 124 by the side surfaces 130C of the recesses 130 of the rotor 124.

When the peripheral direction abutting portions 182C of the spring claws 182 are pushed toward the radial direction outer side of the rotor 124, the peripheral walls of the urging members 190 are pushed toward the radial direction outer side of the rotor 124 by the radial direction abutting portions 182B of the spring claws 182. Therefore, the urging members 190 are pushed by the radial direction abutting portions 182B of the spring claws 182 and the inner peripheral surface of the gear wheel 116 and elastically deform, and the spring claws 182 elastically deform. Due thereto, due to the distal end portions of the spring claws 182 being pulled-out from the recesses 130, the connection, around the axis, of the gear wheel 116 and the rotor 124 by the spring claws 182 is cancelled. Accordingly, relative rotation between the gear wheel 116 and the rotor 124 is permitted.

Due thereto, the spool 20, that is connected to the rotor 124 via the ratchet 134 and the lock bars 154, can be prevented from being rotated in the take-up direction by a force greater than needed due to the driving force of the motor 44, and the webbing can be prevented from binding the body of the vehicle occupant by a force greater than needed.

On the other hand, in a case in which the danger of a vehicle collision is avoided, the rotating shaft of the motor 44 is rotated reversely. The rotational force of the rotating shaft is transmitted to the gear wheel 116 of the clutch main body portion 114 via the unillustrated pinion and the unillustrated gears of the motor gear portion 46 and via the worm gear 34 of the clutch gear portion 28, and the gear wheel 116 is rotated rapidly in the pull-out direction (the arrow D direction in FIG. 1).

The rotation of the gear wheel 116 in the pull-out direction is transmitted to the rotation stopping claws 180 of the ring 176 via the rotation stopping recesses 122 of the gear wheel 116, and is transmitted from the distal end portions of the spring claws 182 of the ring 176 to the recesses 130 of the rotor 124, and the rotor 124 is rotated rapidly in the pull-out direction.

At this time, the sliders 144 are held at the case (the clutch case 101 and the clutch cover 102) by the frictional force that acts on the sliders 144 and the retainers 148. Therefore, the rotor 124 moves relative to the sliders 144 within a predetermined range, and the lock bars 154 that are supported at the rotor 124 approach the sliders 144.

Thus, due to the sliders 144 pushing the lock bars 154, the lock bars 154 move apart from the external teeth 136 of the ratchet 134 against the urging forces of the torsion coil springs 164, and are held at the engagement released positions (the state shown in FIG. 4A). The rotor 124 and the ratchet 134 can thereby rotate relatively, and free rotation of the spool 20 becomes possible.

Here, at the clutch main body portion 114 of the webbing retractor 10, as described above, when the overload releasing mechanism operates, the urging members 190 are pushed by the radial direction abutting portions 182B of the spring claws 182 and the inner peripheral surface of the gear wheel 116, and elastically deform. The urging members 190 thereby urge the distal end portions of the spring claws 182 toward the inner radial direction of the rotor 124 (the arrow A direction in FIG. 5).

Accordingly, when the overload releasing mechanism operates, the engagement of the spring claws 182 with the recesses 130 is cancelled against not only the elastic forces of the spring claws 182 but also against the urging forces of the urging members 190. Due thereto, the operating load of the overload releasing mechanism can be made high by the simple method of merely adding the urging members 190.

The urging members 190 are disposed between the distal end portions of the spring claws 182 and the inner peripheral surface of the gear wheel 116. Due thereto, the clutch main body portion 114 can be prevented from becoming larger.

Further, the urging members 190 urge the distal end portions of the spring claws 182 in the radial direction of the gear wheel 116 and the rotor 124. Therefore, the operating load of the overload releasing mechanism can efficiently be made to be high.

Moreover, in order to make the operating load of the overload releasing function high, the urging members 190 urge the spring claws 182, and therefore, the spring claws 182, including the plastic regions thereof, are utilized, and there is no need to make the engaging force of the spring claws 182 with the recesses 130 high. Thus, even if the overload releasing mechanism is operated repeatedly, a decrease in the operating load of the overload releasing mechanism can be suppressed. Due thereto, the durability of the overload releasing mechanism can be improved.

Further, the urging members 190 are structured as members that are separate from the spring claws 182. Due thereto, the operating load of the overload releasing mechanism can be changed easily by changing the rigidity or the size of the urging members 190.

Second Exemplary Embodiment

Figure 6:
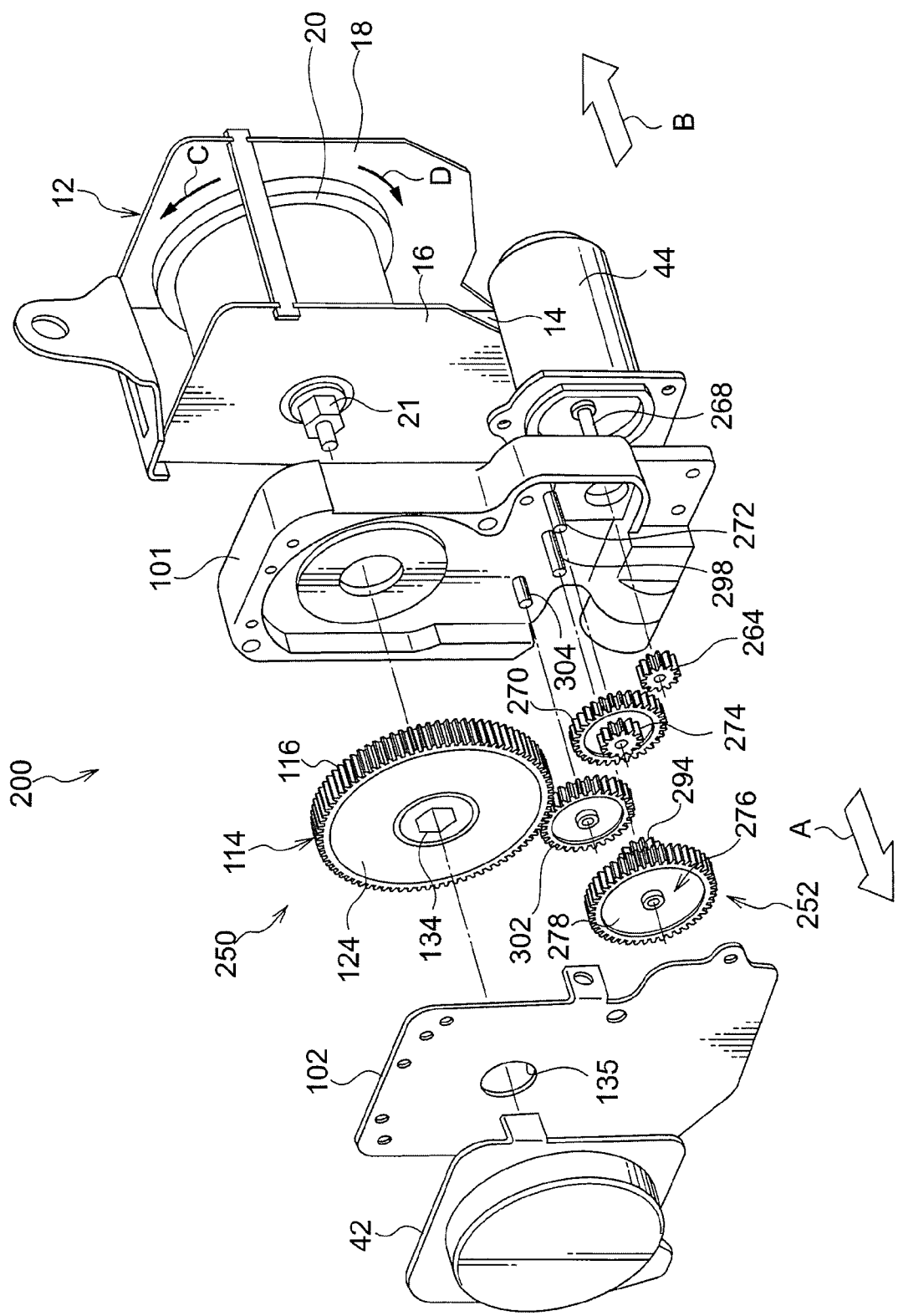
FIG. 6 is a schematic exploded perspective view showing the structure of a webbing retractor relating to a second exemplary embodiment of the present invention.

A webbing retractor 200 relating to a second exemplary embodiment of the present invention is shown in a schematic exploded perspective view in FIG. 6.

Although the webbing retractor 200 relating to the present exemplary embodiment has a structure that is substantially similar to the above-described first exemplary embodiment, the structure of the overload releasing mechanism differs with respect to the following points.

In the first exemplary embodiment, the overload releasing mechanism is provided at the clutch main body portion 114, but, in the present exemplary embodiment, the overload releasing mechanism is provided at a deceleration gear train 252 that is described below.

As shown in FIG. 6, the clutch main body portion 114 at the interior of the clutch case 101 structures a deceleration mechanism 250. The clutch main body portion 114 does not have the ring 176 and the urging members 190. Further, the gear wheel 116 of the clutch main body portion 114 and the rotor 124 always rotate integrally.

Spur teeth are formed at the outer peripheral portion of the gear wheel 116, and these spur teeth correspond to the deceleration gear train 252 that is described below.

On the other hand, the motor 44 is mounted to the clutch case 101 in a state in which the axial direction of a rotating shaft 268 of the motor 44 runs along the axial direction of the spool 20.

Further, the deceleration gear train 252 that structures the deceleration mechanism 250 is accommodated within the clutch case 101. The deceleration gear train 252 has a spur gear 264 that is formed of a resin material. The gear 264 is accommodated within the clutch case 101 in a state in which the axial direction of the gear 264 runs along the axial direction of the spool 20.

The gear 264 is fixed to the rotating shaft 268 of the motor 44. A gear 270, which is formed of a resin material, is disposed at the side, in the radial direction, of the gear 264. The gear 270 has a larger diameter than the gear 264. A supporting shaft 272 is formed at the clutch case 101 so as to correspond to the gear 270. The axial direction of the supporting shaft 272 runs along the axial direction of the spool 20. In a state in which the gear 270 is meshed-together with the gear 264, the gear 270 is supported at the supporting shaft 272 so as to rotate freely.

A spur gear 274 that has a smaller diameter than the gear 270 is provided at one side in the axial direction of the gear 270 (the arrow A side in FIG. 6). The gear 274 is formed integrally with the gear 270 by a resin material, and is disposed coaxially with the gear 270. A large-diameter gear 278, which serves as a motor side rotating body, is provided at the side, in the radial direction, of the gear 274. The large-diameter gear 278 is a large-diameter gear that has a larger diameter than the gear 274, and is formed of a resin material, and structures an overload releasing mechanism 276 (see FIG. 7 and FIG. 8). Note that the overload releasing mechanism 276 is illustrated in a simplified fashion in FIG. 6.

Figure 7:
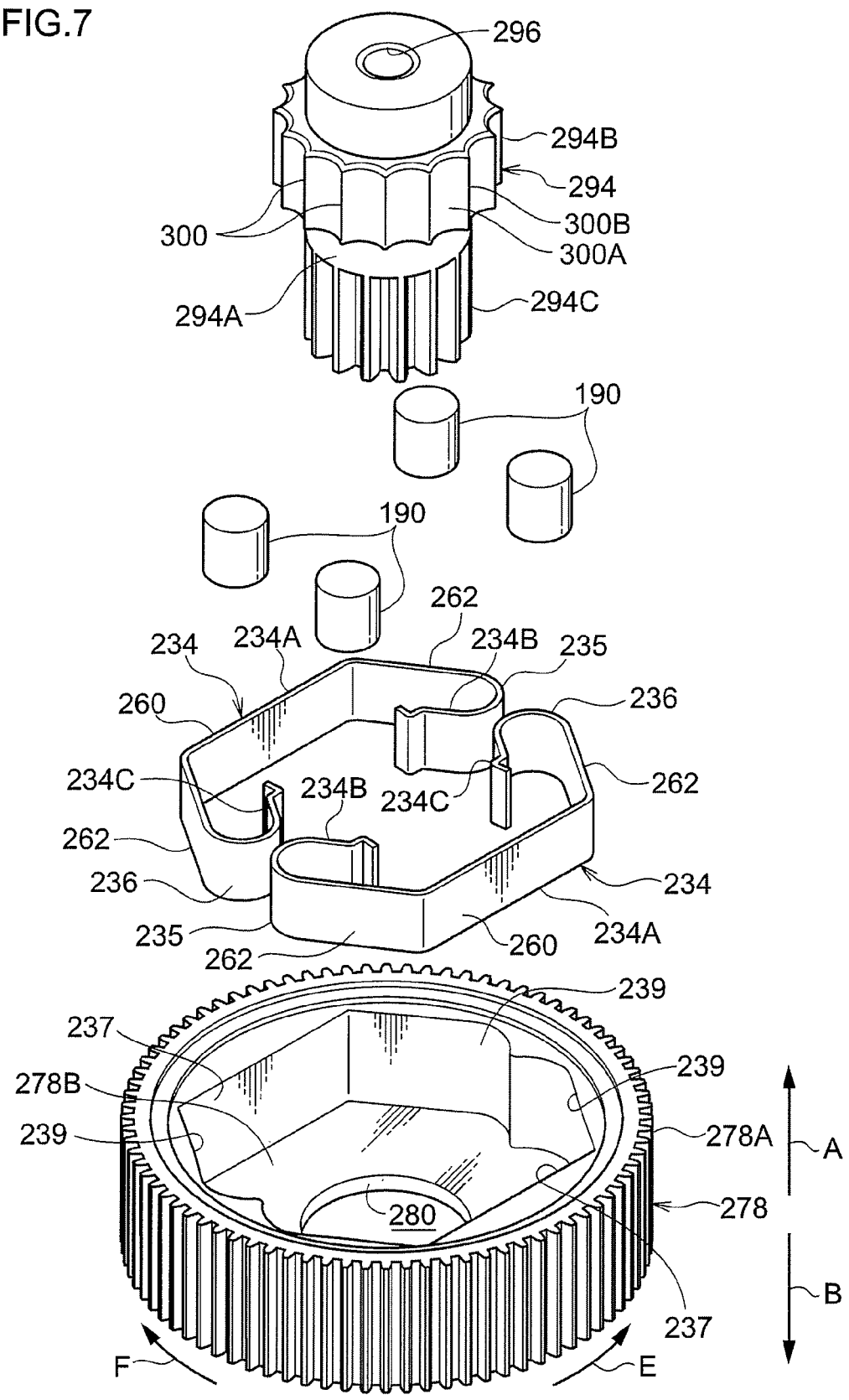
FIG. 7 is an exploded perspective view showing the structure of an overload releasing mechanism that is a structural part of the webbing retractor relating to the second exemplary embodiment of the present invention.
Figure 8:
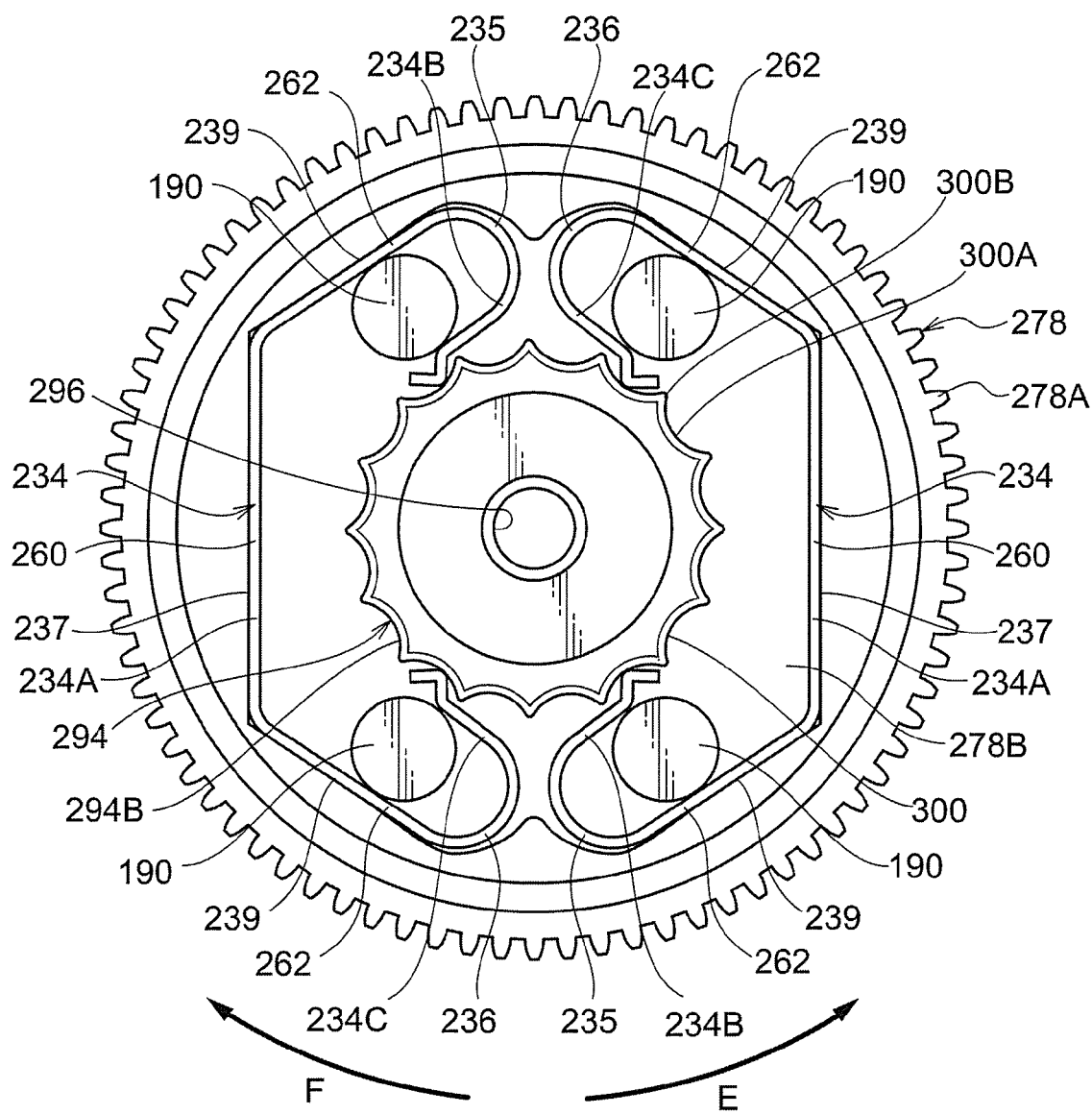
FIG. 8 is a plan view of the overload releasing mechanism shown in FIG. 7.

As shown in FIG. 7 and FIG. 8, the large-diameter gear 278 has a tube portion 278A that is formed in a tube shape (a ring shape), and a floor wall portion 278B that is provided at one end portion in the axial direction of the tube portion 278A (the arrow B side end portion in FIG. 7). The large-diameter gear 278 is formed as a cylindrical tube that has a floor and whose axial length is short. External teeth that are spur teeth are formed at the outer peripheral portion of the tube portion 278A. A through-hole 280, that is circular and concentric with the tube portion 278A, is formed in the central portion of the floor wall portion 278B.

A spring member 232, that serves as a connecting member and that structures the overload releasing mechanism 276, is provided at the inner side of the tube portion 278A. The spring member 232 is structured by plural (two in the present exemplary embodiment) spring bodies 234. Each of the spring bodies 234 is formed by a plate-shaped spring member, and has a load receiving portion 234A that is bent in a substantial U-shape, and a pair of elastically deforming portions 234B, 234C that extend-out integrally from the both end portions of the load receiving portion 234A in directions of approaching one another. The load receiving portion 234A is formed so as to become wider toward the open side, and has an intermediate portion 260 and a pair of arm portions 262 that are provided at both sides of the intermediate portion 260. Further, curved portions 235, 236, that curve in circular arc shapes at the proximal end sides of the elastically deforming portions 234B, 234C (the sides connected to the respective arm portions 262 of the load receiving portion 234A) are provided at the pair of elastically deforming portions 234B, 234C. The distal end sides of the elastically deforming portions 234B, 234C are curved in shapes of the letter S. The portions of the elastically deforming portions 234B, 234C that abut a ratchet portion 294B of a small-diameter gear 294 that is described below are formed as curved surfaces.

The spring bodies 234 are placed at the inner side of the tube portion 278A of the large-diameter gear 278 in a state in which the open sides (the elastically deforming portion 234B, 234C sides) of the load receiving portions 234A face one another. The inner peripheral surface of the tube portion 278A is formed in a substantially hexagonal shape as seen in the axial direction of the tube portion 278A, and has intermediate abutting surfaces 237 that abut the intermediate portions 260 of the load receiving portions 234A, and end side abutting surfaces 239 that oppose the respective arm portions 262. Usually, a slight gap is ensured between the respective end side abutting surfaces 239 and the respective arm portions 262.

Urging members 190, that are similar to those of the first exemplary embodiment and that structure the overload releasing mechanism 276, are disposed between the respective elastically deforming portions 234B, 234C and the arm portions 262 of the spring bodies 234. The urging members 190 abut the elastically deforming portions 234B, 234C and the arm portions 262 in the state in which the urging members 190 are elastically deformed or in the state in which the urging members 190 are not elastically deformed.

On the other hand, the overload releasing mechanism 276 has the small-diameter gear 294 that serves as a take-up shaft side rotating body. The small-diameter gear 294 is formed of a metal material in the form of a solid cylinder that has a smaller diameter than the large-diameter gear 278. A supporting shaft portion 294A is provided at intermediate portion in the axial direction of the small-diameter gear 294. The supporting shaft portion 294A is fit-together with the through-hole 280 that is formed in the floor wall portion 278B of the large-diameter gear 278. Therefore, the small-diameter gear 294 is supported so as to be able to rotate relative to the large-diameter gear 278.

A through-hole 296 that is circular is formed in the axially central portion of the small-diameter gear 294. A supporting shaft 298 (see FIG. 6) that is provided at the clutch case 101 is inserted into this through-hole 296. The axial direction of the supporting shaft 298 runs along the axial direction of the spool 20. The small-diameter gear 294 is rotatably supported at the supporting shaft 298. Further, the supporting shaft 298 rotatably supports the large-diameter gear 278 via the small-diameter gear 294. The external teeth of the large-diameter gear 278 mesh-together with the gear 274.

The ratchet portion 294B, that has a larger diameter than the supporting shaft portion 294A, is provided at one side in the axial direction of the small-diameter gear 294 (the arrow A side in FIG. 7). The ratchet portion 294B is accommodated at the inner side of the tube portion 278A. Ratchet teeth 300 are formed at the outer peripheral portion of the ratchet portion 294B. The ratchet teeth 300 are formed in plural wave shapes, and have valley portions 300A serving as engaging portions, and peak portions 300B. The distal end portions of the plural elastically deforming portions 234B, 234C of the above-described spring member 232 abut the valley portions 300A of the ratchet teeth 300, and the spring member 232 is engaged with the ratchet teeth 300. Therefore, relative rotation of the small-diameter gear 294 with respect to the large-diameter gear 278 is impeded.

When rotational force of a predetermined value or greater is applied between the small-diameter gear 294 and the large-diameter gear 278, the plural elastically deforming portions 234B, 234C of the spring member 232 are pushed by the ratchet teeth 300 toward the load receiving portion 234A sides (the inner peripheral side of the tube portion 278A). When the elastically deforming portions 234B, 234C are pushed by the ratchet teeth 300 toward the load receiving portion 234A sides, the urging members 190 are pushed by the elastically deforming portions 234B, 234C. Therefore, the urging members 190 are pushed against the elastically deforming portions 234B, 234C and the arm portions 262 and elastically deform, and the elastically deforming portions 234B, 234C elastically deform. Due thereto, the distal end portions of the elastically deforming portions 234B, 234C ride-over the respective peak portions 300B of the ratchet teeth 300 while sliding along the plural ratchet teeth 300, and relative rotation of the small-diameter gear 294 with respect to the large-diameter gear 278 is thereby permitted (the overload releasing mechanism 276 is operated).

On the other hand, a gear portion 294C, at whose outer peripheral portion are formed external teeth that are spur teeth, is provided at the other end in the axial direction (the arrow B side in FIG. 7) of the small-diameter gear 294. The gear portion 294C projects-out toward one side in the axial direction (the arrow B side in FIG. 7) of the large-diameter gear 278. A spur gear 302 (see FIG. 6) that has a larger diameter than the small-diameter gear 294 is disposed at the side, in the radial direction, of the small-diameter gear 294. The gear 302 is formed of a metal material. A supporting shaft 304 is formed at the clutch case 101 so as to correspond to the gear 302. The axial direction of the supporting shaft 304 runs along the axial direction of the spool 20. In a state in which the gear 302 is meshed-together with the gear portion 294C of the small-diameter gear 294, the gear 302 is supported at the supporting shaft 304 so as to rotate freely.

An unillustrated spur gear is formed coaxially and integrally with one axial direction side (the arrow B side in FIG. 6) of the gear 302. This gear meshes-together with the gear wheel 116 of the clutch main body portion 114. Due thereto, rotation of the rotating shaft 268 of the motor 44 is transmitted to the gear wheel 116 via the deceleration gear train 252.

When the motor 44 rotates the rotating shaft 268 in the forward direction, the large-diameter gear 278 and the small-diameter gear 294 of the overload releasing mechanism 276 are rotated in one direction around the axis (the arrow E direction in FIG. 7 and FIG. 8), and the gear wheel 116 is rotated in the take-up direction (the arrow C direction in FIG. 6). Further, when the motor 44 reversely-rotates the rotating shaft 268, the large-diameter gear 278 and the small-diameter gear 294 of the overload releasing mechanism 276 are rotated in the other direction around the axis (the arrow F direction in FIG. 7 and FIG. 8), and the gear wheel 116 is rotated in the pull-out direction (the arrow D direction in FIG. 6).

Operation of the present second exemplary embodiment is described next.

In the present webbing retractor 200, in the same way as in the first exemplary embodiment, a vehicle occupant sits-down on a seat of the vehicle, and pulls the webbing out from the present webbing retractor 200, and can place the webbing around his/her body so as to apply the webbing to his/her body.

On the other hand, when, for example, there is an obstacle in front of the vehicle while the vehicle is traveling, and further, the interval between the vehicle and the obstacle (the distance from the vehicle to the obstacle) comes to within a predetermined range, driving of the motor 44 is started, and the rotating shaft 268 is rotated rapidly.

When the rotating shaft 268 is rotated by the driving force of the motor 44, the rotational force of the rotating shaft 268 is transmitted to the large-diameter gear 278 of the overload releasing mechanism 276 via the gears 264, 270, 274, and the large-diameter gear 278 is rotated in one direction around the axis (the arrow E direction in FIG. 7 and FIG. 8). The rotation of the large-diameter gear 278 is transmitted to the small-diameter gear 294 via the spring member 232, and the small-diameter gear 294 is rotated in one direction around the axis (the arrow E direction in FIG. 7 and FIG. 8). The rotation of the small-diameter gear 294 is transmitted to the gear wheel 116 of the clutch main body portion 114 via the gear 302 and the unillustrated gear that is provided coaxially and integrally with the gear 302, and the clutch main body portion 114 is rotated in the take-up direction (the arrow C direction in FIG. 6).

When the clutch main body portion 114 is rotated in the take-up direction, the lock bars 154 that are provided at the clutch main body portion 114 mesh-together with the ratchet 134, and rotation of the clutch main body portion 114 in the take-up direction relative to the ratchet 134 is restricted. In this state, when the clutch main body portion 114 is rotated further in the take-up direction, the ratchet 134 is rotated in the take-up direction together with the clutch main body portion 114.

Because the ratchet 134 is connected to the spool 20 via the connecting screw 21, due to the ratchet 134 rotating in the take-up direction, the spool 20 is rotated in the take-up direction, and the webbing is taken-up, from the longitudinal direction proximal end side thereof, onto the spool 20. Due thereto, the slight looseness, or so-called "slack", in the webbing that is applied to the body of the vehicle occupant is eliminated, and the ability of the webbing to restrain the vehicle occupant improves.

Further, in the state in which the "slack" is eliminated, the body of the vehicle occupant becomes an obstruction, and basically, the webbing cannot be taken-up any more onto the spool 20. Therefore, rotational force in the pull-out direction (the arrow D direction in FIG. 6) is inputted to the spool 20 via the webbing. This rotational force in the pull-out direction is transmitted to the small-diameter gear 294 of the overload releasing mechanism 276 via the gear wheel 116 of the clutch main body portion 114, the unillustrated gear that is meshed-together with the gear wheel 116, and the gear 302 that is provided coaxially and integrally with this gear. Rotational force in the arrow F direction in FIG. 7 and FIG. 8 is imparted to the small-diameter gear 294.

At this time, the large-diameter gear 278 attempts to rotate in the arrow E direction in FIG. 7 and FIG. 8 due to the driving force of the motor 44. Therefore, relative rotational force is applied between the small-diameter gear 294 and the large-diameter gear 278. When this rotational force becomes greater than or equal to a predetermined value, the plural elastically deforming portions 234B, 234C of the spring member 232 that is attached to the large-diameter gear 278 are pushed by the ratchet teeth 300 toward the load receiving portion 234A sides (the inner peripheral side of the tube portion 278A). When the elastically deforming portions 234B, 234C are pushed by the ratchet teeth 300 toward the load receiving portion 234A sides, the urging members 190 are pushed by the elastically deforming portions 234B, 234C. Therefore, the urging members 190 are pushed against the elastically deforming portions 234B, 234C and the arm portions 262 and elastically deform, and the elastically deforming portions 234B, 234C elastically deform. Due thereto, the distal end portions of the elastically deforming portions 234B, 234C ride-over the respective peak portions 300B of the ratchet teeth 300 while sliding on the plural ratchet teeth 300, and relative rotation of the small-diameter gear 294 with respect to the large-diameter gear 278 is thereby permitted.

Due thereto, the spool 20, that is connected to the clutch main body portion 114 via the ratchet 134 and the lock bars 154, can be prevented from rotating in the take-up direction at a force greater than needed due to the driving force of the motor 44, and the webbing can be prevented from binding the body of the vehicle occupant by a force greater than needed.

On the other hand, in a case in which the danger of a vehicle collision is avoided, the rotating shaft 268 of the motor 44 is rotated reversely. The rotational force of the rotating shaft 268 is transmitted to the large-diameter gear 278 of the overload releasing mechanism 276 via the gears 264, 270, 274, and the large-diameter gear 278 is rotated in the other direction around the axis (the arrow F direction in FIG. 7 and FIG. 8). The rotation of the large-diameter gear 278 is transmitted to the small-diameter gear 294 via the spring member 232, and the small-diameter gear 294 is rotated in the other direction around the axis (the arrow F direction in FIG. 7 and FIG. 8). The rotation of the small-diameter gear 294 is transmitted to the gear wheel 116 of the clutch main body 114 via the gear 302 and the unillustrated gear that is provided coaxially and integrally with the gear 302, and the clutch main body portion 114 is rotated in the pull-out direction (the arrow D direction in FIG. 6).

When the clutch main body portion 114 is rotated in the pull-out direction, the state in which lock bars 154, that are provided at the clutch main body portion 114, are meshed-together with the ratchet 134 is released. Therefore, the connection of the spool 20 and the clutch main body portion 114 is released, and free rotation of the spool 20 becomes possible.

Accordingly, in the present exemplary embodiment as well, operation and effects that are basically similar to those of the first exemplary embodiment are exhibited.

Note that, in the first exemplary embodiment and the second exemplary embodiment, the recess portions 130 and the valley portions 300A that are the engaging portions are formed at the outer peripheral portions of the rotor 124 and the small-diameter gear 294 that serve as take-up shaft side rotating bodies respectively. However, the engaging portions may be formed at the gear wheel 116 and the large-diameter gear 278 that serve as motor side rotating bodies. In this case, the ring 176 and the spring member 232 are structures that are mounted so as to be unable to rotate relative to the rotor 124 and the small-diameter gear 294, respectively.

Further, in the first exemplary embodiment and the second exemplary embodiment, the urging members 190 are formed of rubber, but, for example, may be formed of an elastomer resin that has elasticity. In this case, the urging members 190 and the gear wheel 116 or the large-diameter gear 278 can be molded integrally. Due thereto, the number of work processes can be decreased, and the assemblability can be improved.

Moreover, although the urging members 190 are formed in the shapes of solid cylinders in the first exemplary embodiment and the second exemplary embodiment, the shape of the urging members 190 is not limited to the same. For example, the urging members 190 may be formed in shapes of prisms or in shapes of cylindrical tubes. By changing the shape of the urging members 190 in this way, the operating load of the overload releasing function can be changed easily.

What is claimed is:
1. A webbing retractor comprising:
   a take-up shaft around which a webbing for restraining a vehicle occupant is taken-up;
   a motor side rotating body that is rotated due to rotation of a motor being transmitted thereto;
   a take-up shaft side rotating body that is provided so as to be able to rotate relative to the motor side rotating body, and that rotates the take-up shaft due to rotation of the take-up shaft side rotating body being transmitted to the take-up shaft;

a connecting member that has an elastically deforming portion engaging with an engaging portion provided at one of the motor side rotating body or the take-up shaft side rotating body, and that connects the motor side rotating body with the take-up shaft side rotating body, and, when relative rotational force is applied between the motor side rotating body and the take-up shaft side rotating body, the elastically deforming portion elastically deforms and engagement of the elastically deforming portion with the engaging portion is released, and connection between the motor side rotating body and the take-up shaft side rotating body is thereby released; and an elastic member that is separate from the elastically deforming portion of the connecting member and that, when compressed, urges the elastically deforming portion toward a side of engaging with the engaging portion.

2. The webbing retractor of claim 1, wherein the elastic member is disposed between the elastically deforming portion and another of the motor side rotating body and the take-up shaft side rotating body.

3. The webbing retractor of claim 2, wherein the elastic body urges the elastically deforming portion in a radial direction of the motor side rotating body and the take-up shaft side rotating body.

4. The webbing retractor of claim 1, wherein the elastic member urges the elastically deforming portion in a radial direction of the motor side rotating body and the take-up shaft side rotating body.

* * * * *